United States Patent [19]
Konopka

[11] Patent Number: 5,994,847
[45] Date of Patent: *Nov. 30, 1999

[54] ELECTRONIC BALLAST WITH LAMP CURRENT VALLEY-FILL POWER FACTOR CORRECTION

[75] Inventor: John G. Konopka, Barrington, Ill.

[73] Assignee: Motorola Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,364

[22] Filed: Jan. 31, 1997

[51] Int. Cl.$^6$ .................................................. H05B 37/02
[52] U.S. Cl. .............. 315/209 R; 315/219; 315/DIG. 7; 315/244; 315/247; 315/307
[58] Field of Search ................................ 315/219, 209 R, 315/DIG. 7, 244, 247, 307

[56] References Cited

U.S. PATENT DOCUMENTS

| | | | |
|---|---|---|---|
| 4,560,908 | 12/1985 | Stupp et al. | 315/219 |
| 4,855,860 | 8/1989 | Nilssen | 361/45 |
| 4,888,525 | 12/1989 | Nilssen | 315/212 |
| 5,041,766 | 8/1991 | Fiene et al. | 315/DIG. 7 |
| 5,134,344 | 7/1992 | Vos et al. | 315/239 |
| 5,258,692 | 11/1993 | Jones | 315/DIG. 7 |
| 5,363,020 | 11/1994 | Chen et al. | 315/209 R |
| 5,387,848 | 2/1995 | Wong | 315/224 |
| 5,399,944 | 3/1995 | Konopka et al. | 315/219 |
| 5,434,481 | 7/1995 | Nilssen | 315/247 |
| 5,519,289 | 5/1996 | Katyl et al. | 315/224 |
| 5,539,281 | 7/1996 | Shackle et al. | 315/209 R |
| 5,578,907 | 11/1996 | Tao et al. | 315/247 |
| 5,608,292 | 3/1997 | Konopka et al. | 315/219 |

OTHER PUBLICATIONS

"Modified Valley Fill High Power Factor Electronic Ballast for Compact Fluorescent Lamps," IEEE Transactions on Power ELectronics Authors: Mustansir H. Kheraluwals, Sayed Amr El–Hamamsy Jun., 1995, pp. 10–14.

*Primary Examiner*—Michael B. Shingleton
*Attorney, Agent, or Firm*—Kenneth D. Labudda; Gary J. Cunningham

[57] ABSTRACT

An electronic ballast (10) for powering at least one gas discharge lamp (30) includes a rectifier circuit (100), a line blocking rectifier (220), a bulk capacitor (240), an inverter (300), an output circuit (400), and a charging circuit (500). Charging circuit (500) is coupled between the output circuit (400) and the bulk capacitor (240) and provides operating current to the bulk capacitor (240). Charging circuit (500) also protects lamp life by preventing excessive flow of DC current in the lamp (30) following application of AC power to the ballast (10). In a preferred embodiment, charging circuit (500) includes a DC blocking capacitor (510), a lamp current blocking rectifier (530), and a charging rectifier (540).

10 Claims, 5 Drawing Sheets

ELECTRONIC BALLAST WITH LAMP CURRENT VALLEY-FILL POWER FACTOR CORRECTION

FIELD OF THE INVENTION

The present invention relates to the general subject of electronic ballasts and, in particular, to an electronic ballast with lamp current valley-fill power factor correction.

BACKGROUND OF THE INVENTION

Valley-fill circuits have long been recognized as a simple, low-cost option for providing power factor correction in power supplies and electronic ballasts that operate from a source of conventional AC power. The general idea of valley-fill power factor correction is to improve the shape of the current drawn from the AC line by increasing the conduction period of the rectifier diodes. This is achieved by maintaining a voltage on the bulk capacitors that is equal to a fraction of the peak value of the AC line voltage.

As illustrated in FIG. 1, a conventional valley-fill circuit requires a number of diodes ($D_1$, $D_2$, $D_3$) and two bulk capacitors ($C_1$, $C_2$). For most applications, the bulk capacitors are high capacitance, high voltage electrolytic capacitors (e.g. 47 microfarads, 250 volts) and are therefore quite costly. Thus, significant impetus exists for alternative valley-fill approaches which require only a single bulk capacitor and a low number of peripheral components.

A modified valley-fill circuit that requires only a single bulk capacitor is described in FIG. 2. This approach uses energy from the resonant inductor ($L_R$) to charge the bulk capacitor ($C_B$). However, this approach is problematic since it requires a secondary winding on the resonant inductor, which adds significant cost and complexity to the resonant inductor and degrades the energy efficiency of the ballast.

Another valley-fill approach that requires only a single bulk capacitor is described in FIG. 3. This approach, which uses the positive half-cycles of the lamp current, $I_{LAMP}$, to charge the bulk capacitor ($C_B$), is less expensive and more efficient than the approach of FIG. 2. However, it has two serious disadvantages. First, as the voltage across the bulk capacitor ($V_{BULK}$) is a fixed fraction of the peak value of the AC line voltage, this approach affords no option of designing for a bulk capacitor voltage that provides an optimal compromise between the competing requirements of power factor correction (which improves with lower values of $V_{BULK}$) and lamp current crest factor (which is lower for higher values of $V_{BULK}$). Secondly, this approach allows a substantial DC current to flow through the lamp for a considerable period of time after AC power is applied to the ballast. That is, following initial application of AC power to the ballast, a DC current will flow through the lamp during the period of time it takes for the bulk capacitor to initially charge up. The consequence of this DC current flowing through the fluorescent lamp for such a considerable period of time is migration of mercury from one end of the lamp to the other. Since this DC current will flow in the same direction each time the ballast is turned on, the migration effect is cumulative over time (unless the lamp is periodically removed and reinstalled in a reverse direction) and will significantly reduce the useful life of the lamp.

It is therefore apparent that an electronic ballast with a modified valley-fill circuit that requires only a single bulk capacitor, that allows for a design-adjustable value of the bulk capacitor voltage, that preserves lamp life by minimizing migration effects in the lamp, that is realizable with few components, and that is highly energy efficient, would represent a considerable advance over the prior art.

DETAILED DESCRIPTION OF THE PREFERRED EMBODIMENTS

Figure 1:
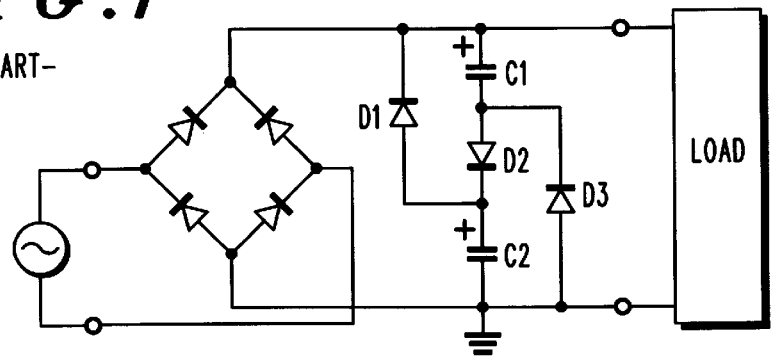
FIG. 1 describes a conventional valley-fill power factor correction circuit.
Figure 2:
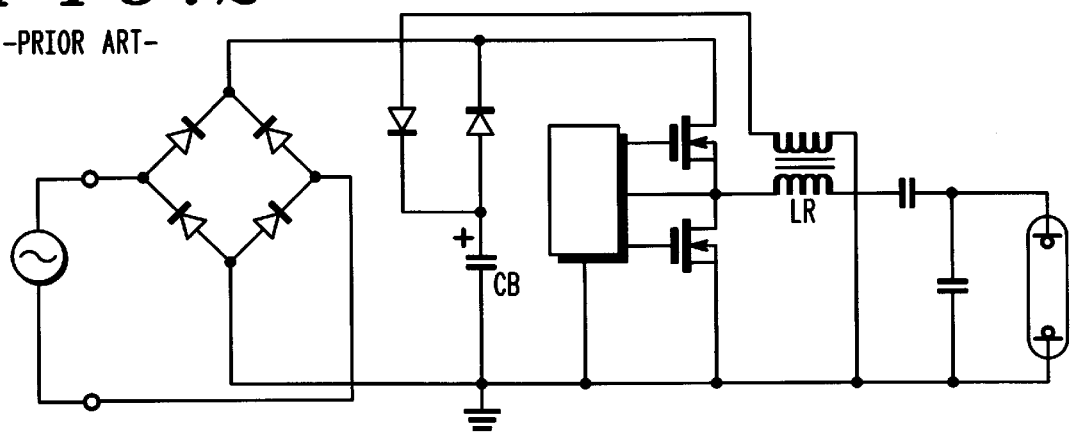
FIG. 2 describes a first prior art electronic ballast with an alternative valley-fill power factor correction circuit.
Figure 3:
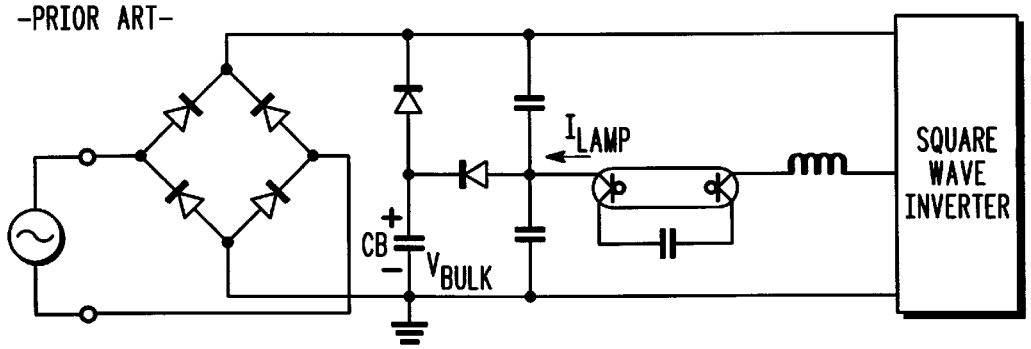
FIG. 3 describes a second prior art electronic ballast with an alternative valley-fill power factor correction circuit.
Figure 4:
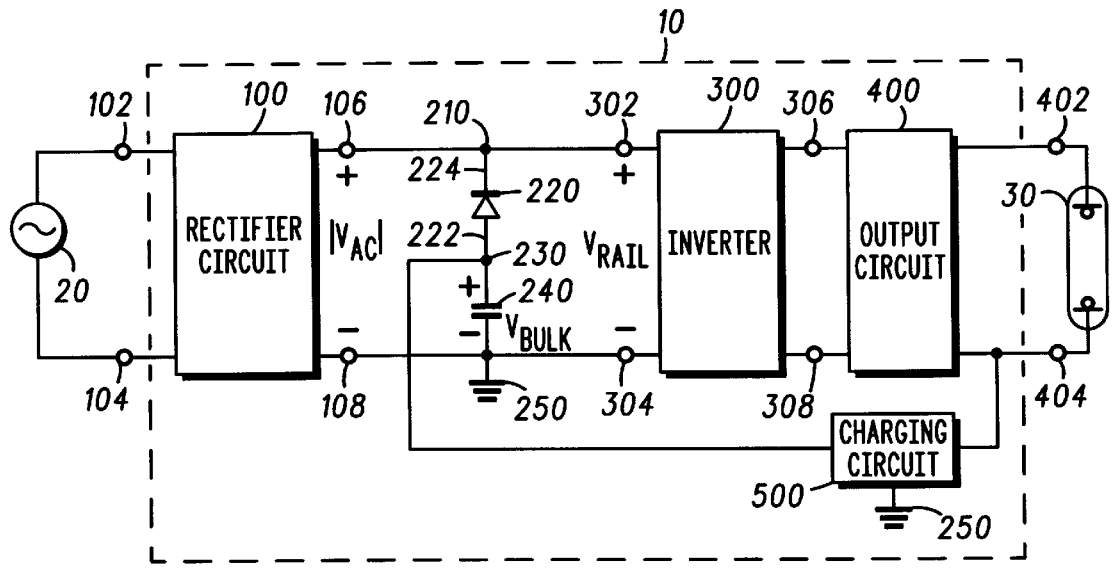
FIG. 4 describes an electronic ballast with a modified valley-fill power factor correction circuit, in accordance with the present invention.

An electronic ballast 10 for powering one or more gas discharge lamps is described in FIG. 4. Electronic ballast 10 comprises a rectifier circuit 100, a line blocking rectifier 220, a bulk capacitor 240, an inverter 300, an output circuit 400, and a charging circuit 500.

As illustrated in FIG. 4, rectifier circuit 100 includes a pair of input terminals 102,104 that are adapted to receive a source of alternating current 20, and a pair of output terminals 106,108. First output terminal 106 is coupled to a DC rail node 210, while second output terminal 108 is coupled to a circuit ground node 250. Line blocking rectifier 220 has an anode 222 that is coupled to a first node 230, and a cathode 224 that is coupled to DC rail node 210. Bulk capacitor 240 is coupled between first node 230 and circuit ground node 250.

Inverter 300 comprises a pair of input connections 302, 304 and a pair of output connections 306,308. Input connections 302,304 are coupled to the output terminals 106, 108 of rectifier circuit 100. During operation, inverter 300 provides a high frequency squarewave voltage between output connections 306,308. Output circuit 400 is coupled across inverter output connections 306,308 and includes first and second output wires 402,404 that are adapted for coupling to one or more gas discharge lamps. For the sake of clarity, only one lamp 30 is shown and discussed in the present description, although it should be appreciated that output circuit 400 may be readily modified to accommodate multiple lamps.

Charging circuit 500 is coupled between second output wire 404 and first node 230. During operation, charging circuit 500 uses the lamp current to supply charging current to bulk capacitor 240. Charging circuit 500 also prevents excessive flow of DC current through the lamp 30 following application of AC power to ballast 10.

Figure 5:
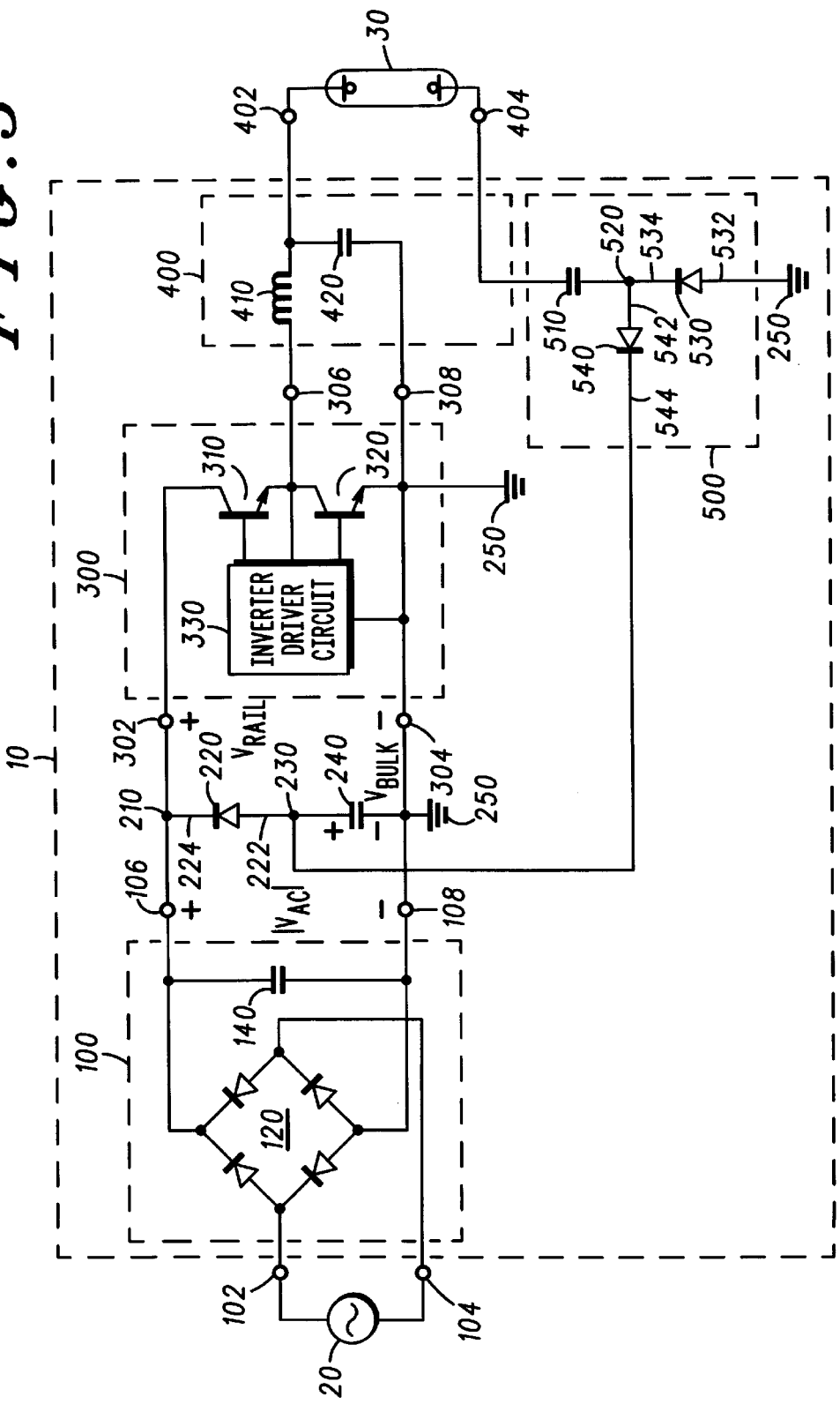
FIG. 5 is a circuit schematic of an electronic ballast having a modified valley-fill power factor correction circuit and a half-bridge inverter, in accordance with a preferred embodiment of the present invention.

Turning now to FIG. 5, in a preferred embodiment of electronic ballast 10, charging circuit 500 comprises a DC blocking capacitor 510, a lamp current blocking rectifier 530, and a charging rectifier 540. DC blocking capacitor 510 is coupled between the second output wire 404 and a second node 520. Lamp current blocking rectifier 530 has an anode 532 that is coupled to circuit ground node 250, and a cathode 534 that is coupled to second node 520. Charging rectifier 540 has an anode 542 that is coupled to second node 520 and a cathode 544 that is coupled to bulk capacitor 240 via first node 230.

As shown in FIG. 5, rectifier circuit 100 is preferably implemented using a full-wave diode bridge 120 and a high frequency bypass capacitor 140. High frequency bypass capacitor 140, which is typically chosen to have a capacitance on the order of a fraction of a microfarad, supplies high frequency current drawn by inverter 300. Inverter 300 preferably includes first and second inverter switches 310, 320 connected in a half-bridge arrangement. First inverter switch 310 is coupled between the first input connection 302 and the first output connection 306 of inverter 300, while second inverter switch 320 is coupled between the first and second output connections 306,308 of inverter 300. Inverter switches 310,320 are shown as bipolar junction transistors, but may be implemented using any one of a number of controllable power switching devices, such as field-effect transistors. Inverter switches 310,320 are switched on and off in a substantially complementary fashion and at a high frequency (in excess of 20,000 Hertz) by an inverter driver circuit 330. Inverter driver circuit 330 may be implemented using a self-oscillating arrangement or a dedicated driver circuit, such as the IR2151 high-side driver integrated circuit manufactured by International Rectifier.

In a preferred embodiment of ballast 10, output circuit 400 includes a series resonant circuit comprising a resonant inductor 410 and a resonant capacitor 420. Resonant inductor 410 is coupled between the first output connection 306 of the inverter 300 and the first output wire 402. Resonant capacitor 420 is coupled between the first output wire 402 and circuit ground node 250. During operation, output circuit 400 provides a high voltage for igniting lamp and supplies a substantially sinusoidal, high frequency current for driving lamp 30 in an energy-efficient manner.

Figure 6:
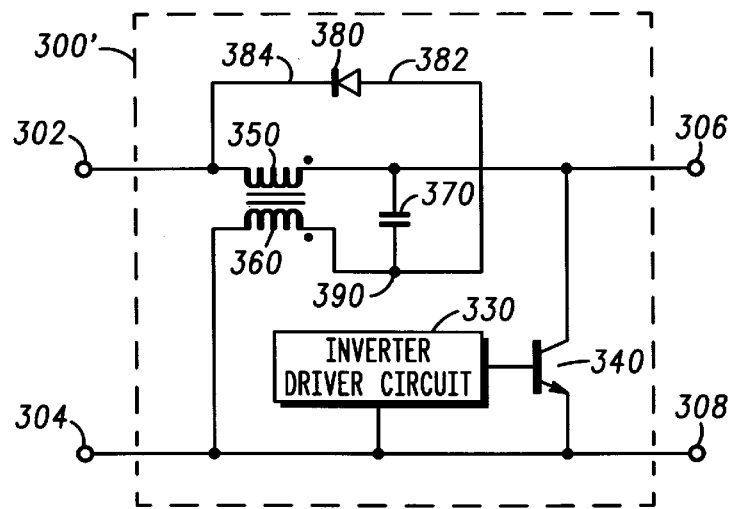
FIG. 6 is a circuit schematic of a single switch inverter that may be used in place of a half-bridge inverter in the electronic ballast of FIG. 5, in accordance with an alternative embodiment of the present invention.

FIG. 6 describes an alternative low-cost inverter that may be employed in ballast 10. Single switch inverter 300' includes a clamp transformer having primary and secondary windings 350,360, a single inverter switch 340, a clamping capacitor 370, and a clamping rectifier 380. Primary winding 350 is coupled between the first input connection 302 and the first output connection 306 of inverter 300'. Secondary winding 360 is coupled between a third node 390 and second input connection 304. Inverter switch 340 is coupled between inverter output connections 306,308. Clamping capacitor 370 is coupled between third node 390 and first output terminal 306. Clamping rectifier 380 has an anode 382 that is coupled to third node 390 and a cathode 384 that is coupled to first input connection 302. The detailed operation of single switch inverter 300' is discussed in U.S. Pat. No. 5,399,944 issued to Konopka.

Turning back to FIG. 5, the detailed operation of ballast 10 is explained as follows. When AC power is initially applied to ballast 10, bulk capacitor 240 and DC blocking capacitor 510 are both uncharged. A predetermined period of time after AC power is applied to ballast 10, inverter driver circuit 330 turns on and begins switching of inverter switches 310,320 at a frequency that is close to the natural resonant frequency of resonant inductor 410 and resonant capacitor 420. Consequently, a large voltage develops across resonant capacitor 420 and causes lamp 30 to ignite and begin operating.

Once lamp 30 begins operating, current begins to flow into DC blocking capacitor 510. For a brief period of time, since capacitor 510 is initially uncharged, this current will have a significant DC component. However, due to its relatively small capacitance value (e.g. 0.1 microfarad), capacitor 510 charges up very rapidly and soon reaches a DC voltage equal to one half the average value of the inverter input voltage, $V_{RAIL}$. Therefore, although a DC current flows through lamp 30 after AC power is initially applied to ballast 10, it has a very limited duration and thus causes negligible migration effects in lamp 30.

During the positive half-cycles of $I_{LAMP}$ (i.e., during those periods when a positive current is flowing out of first output wire 402, through lamp 30, and into second output wire 404), lamp current blocking rectifier 530 is reverse-biased and prevents lamp current from returning directly to circuit ground node 250. Charging rectifier 540, on the other hand, is forward-biased and thus delivers a substantial portion of each positive half-cycle of $I_{LAMP}$ to bulk capacitor 240. In this way, the positive half-cycles of $I_{LAMP}$ are used to charge up bulk capacitor 240.

During the negative half-cycles of $I_{LAMP}$ (i.e., during those periods when a positive current is flowing out of second output wire 404, through lamp 30, and into first output wire 402), lamp current blocking rectifier 530 is forward-biased and provides a path for $I_{LAMP}$ to flow directly up from circuit ground node 250. At the same time, charging rectifier 540 is reverse-biased and thus prevents bulk capacitor 240 from discharging back into charging circuit 500.

Referring again to FIG. 5, during those periods in the AC line voltage cycle when the rectified AC line voltage, $|V_{AC}|$, is greater than $V_{BULK}$, line blocking rectifier 220 is reverse-biased and, consequently, the energy demanded by inverter 300 is supplied directly from AC source 20. On the other hand, during those portions of the AC line cycle in which $|V_{AC}|$ is less than $V_{BULK}$, line blocking rectifier 220 is forward-biased and the energy demands of inverter 300 are supplied solely by bulk capacitor 240. While bulk capacitor 240 is supplying power to inverter 300, the diodes in full-wave bridge 120 are reverse-biased, so no current is drawn from AC source 20 during such periods.

As alluded to previously, in ballasts that employ valley-fill power factor correction, the value of $V_{BULK}$ largely determines both the level of power factor correction and the resulting lamp current crest factor. In particular, higher values of $V_{BULK}$ tend to optimize the crest factor, but degrade power factor correction. Conversely, lower values of $V_{BULK}$ enhance power factor correction, but increase the crest factor of the lamp current.

In electronic ballast 10, $V_{BULK}$ is primarily dependent upon two factors: (i) the current demand, $I_{LOAD}$, placed on the bulk capacitor 240 by the inverter 300, and (ii) the amount of charging current, $I_{CHARGE}$, delivered to bulk capacitor 240 by charging circuit 500. For example, if $I_{CHARGE}$ is increased while $I_{LOAD}$ remains unchanged, then $V_{BULK}$ will increase. Conversely, if $I_{CHARGE}$ remains unchanged and $I_{LOAD}$ is increased, then $V_{BULK}$ will correspondingly decrease. It is thus apparent that, in order to achieve a value of $V_{BULK}$ that provides a good compromise between the competing requirements of a high level of power factor correction and low lamp current crest factor, it is highly desirable to have some design option by which the charging current provided to the bulk capacitor can be adjusted. Such design options are provided by modifying output circuit 400 and charging circuit 500 as described in FIGS. 7 and 8.

Figure 7:
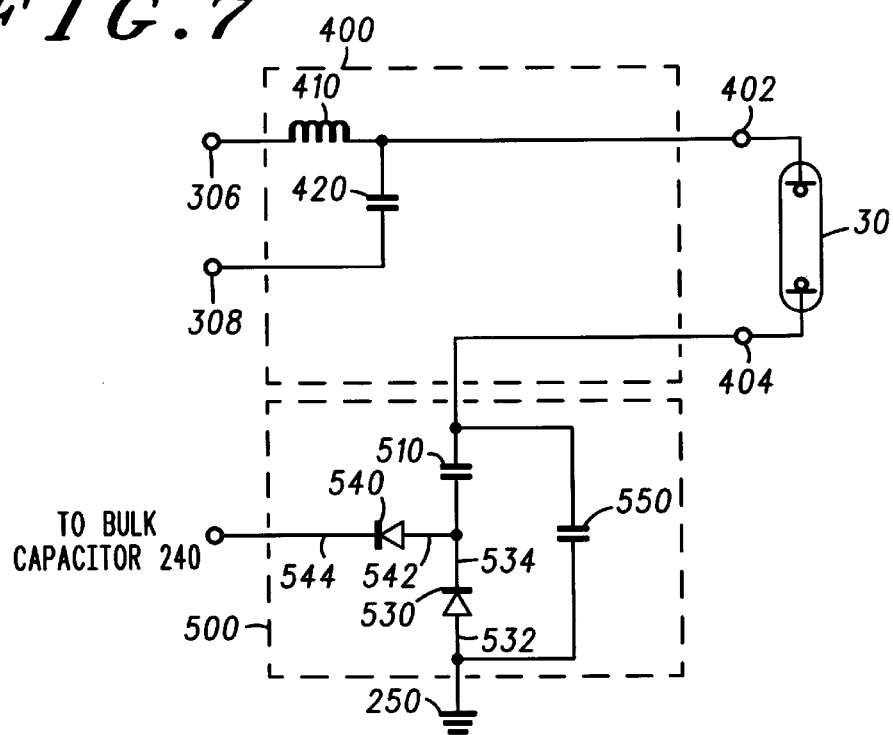
FIG. 7 is a circuit schematic of an output circuit and charging circuit that includes a shunt capacitor, in accordance with one embodiment of the present invention.

Turning first to FIG. 7, a shunt capacitor 550 may be added to charging circuit 500 as shown. Shunt capacitor 550, coupled between second output wire 404 and circuit ground node 250, provides a current bypass path that reduces the amount of current through DC blocking capacitor 510 and thus reduces the amount of charging current that is transferred to bulk capacitor 240 via charging diode 540. The end result is a reduction in $V_{BULK}$. Thus, shunt capacitor 550 is useful for those applications in which a reduction in $V_{BULK}$ is desired.

Figure 8:
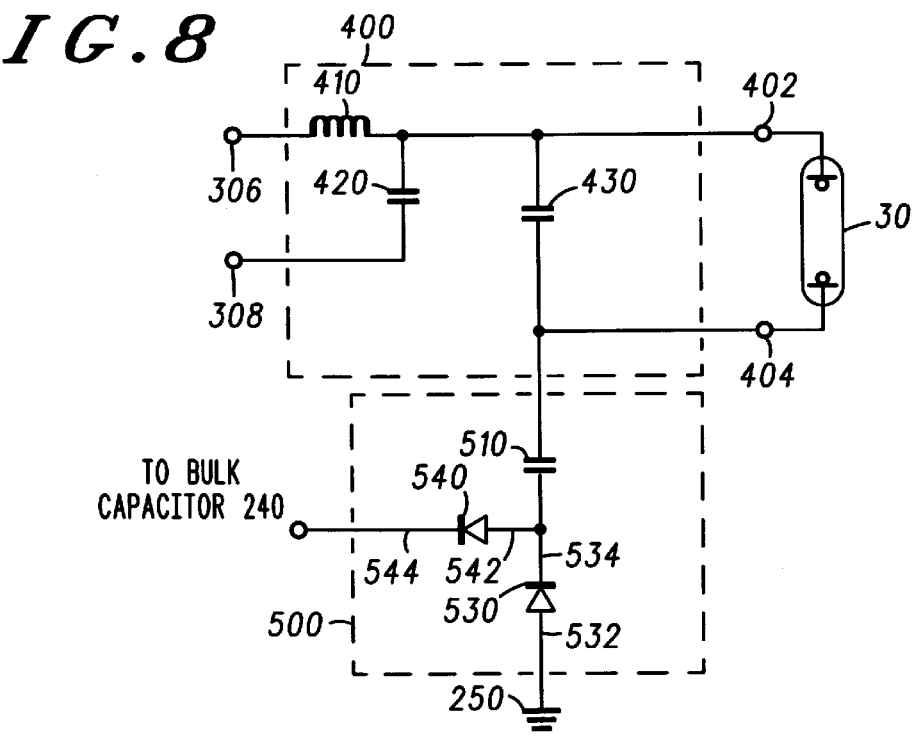
FIG. 8 is a circuit schematic of an output circuit and charging circuit that includes a second resonant capacitor, in accordance with one embodiment of the present invention.

Referring now to FIG. 8, for those applications in which an increased value of $V_{BULK}$ is desired, a second resonant capacitor 430 can be added to output circuit 400. By adding second resonant capacitor 430, the amount of current that flows through DC blocking capacitor 510 is increased from just the lamp current alone to the sum of the lamp current and the resonant current that flows through capacitor 430. Correspondingly, the amount of charging current delivered to bulk capacitor 240 is increased which, in turn, causes an increase in $V_{BULK}$.

In summary, shunt capacitor 550 and second resonant capacitor 430 provide a great deal of flexibility by allowing the designer to set $V_{BULK}$ to a value that is optimal for power factor correction when the lamp current alone is either too small (i.e., $V_{BULK}$ is lower than optimal) or is too large (i.e., $V_{BULK}$ is higher than optimal) to provide an appropriate amount of charging current for bulk capacitor 240.

Figure 9:
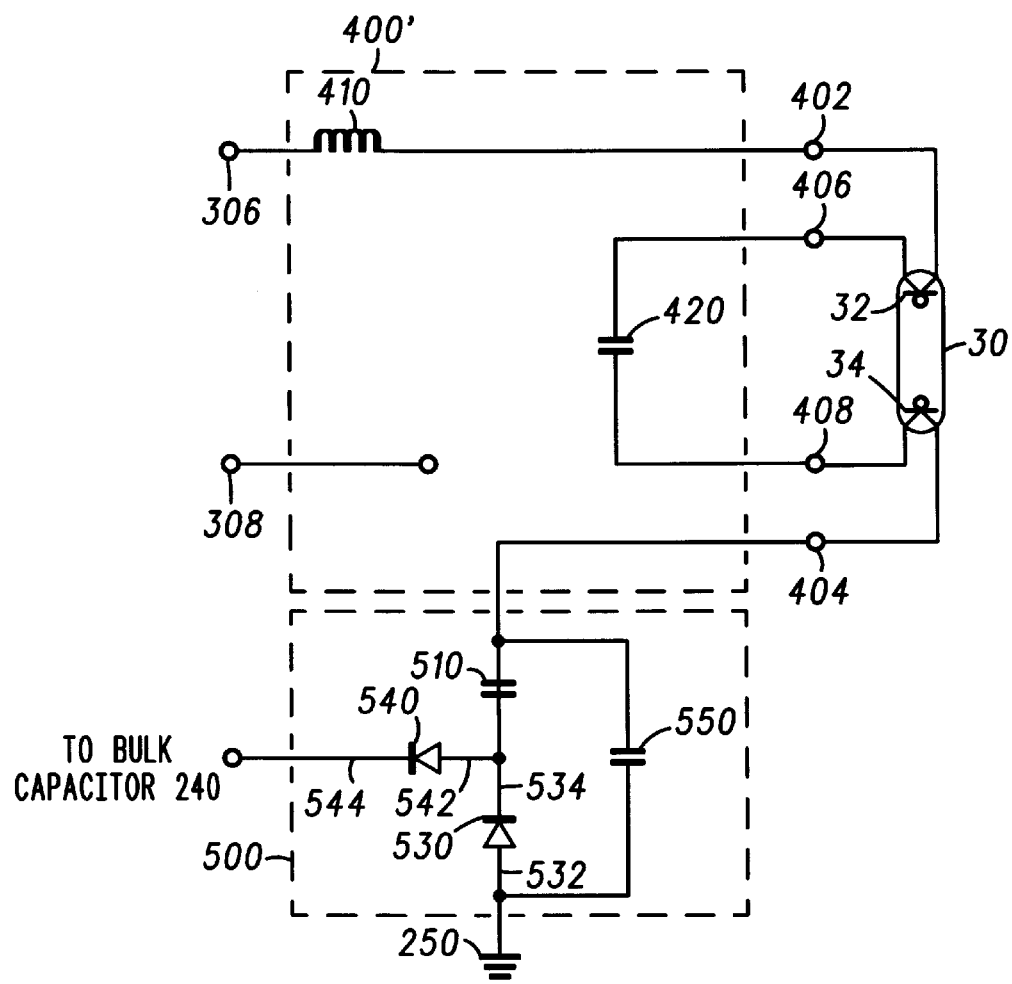
FIG. 9 is a circuit schematic of an output circuit and charging circuit that provides heating current to the lamp filaments, in accordance with one embodiment of the present invention.

Ballast 10 may also be modified to provide heating current to the lamp filaments 32,34. An example of such an arrangement is shown in the output circuit 400' of FIG. 9, in which resonant current is forced to flow through the lamp filaments 32,34 by virtue of the connection of resonant capacitor 420 in series with the filaments 32,34. Structurally, output circuit 400' includes a third output wire 406 that is coupled to the first output wire 402 through a first lamp filament 32, and a fourth output wire 408 that is coupled to the second output wire 404 through a second lamp filament 34. In this arrangement, resonant capacitor 420 is coupled between the third and fourth output wires 406,408. Output circuit 400' has the added benefit of providing automatic shutdown of the ballast output (i.e. the power provided at the output wires) if the lamp 30 is removed or if one or both filaments 32,34 are either open or are not properly connected to output wires 402,404,406,408.

Output circuit 400' optionally includes a shunt capacitor 550, previously discussed with regard to FIG. 7, for reducing the amount of charging current provided to bulk capacitor 240 and thereby setting $V_{BULK}$ to a desired value.

A prototype ballast configured substantially as shown in FIG. 5 was designed for powering two 32 watt T8 fluorescent lamps from a conventional 277 volt (rms) AC source. In one experiment, a power factor of about 0.95 and a total harmonic distortion of less than 30% were measured. The lamp current crest factor was measured at about 1.7, which is typically regarded as the maximum allowable value for which rated lamp life is guaranteed by fluorescent lamp manufacturers.

Electronic ballast 10 provides a number of important advantages that, in combination, render it preferable over many existing ballast circuits. First of all, ballast 10 is extremely economical with regard to component count, material cost, and ease of manufacture. Secondly, due to an efficient charging circuit 500 that uses the lamp current to charge the bulk capacitor 240, ballast 10 operates with low power losses. Furthermore, electronic ballast 10 substantially eliminates harmful migration effects in the lamp by greatly limiting the time during which DC current flows through the lamp following application of power to ballast 10. Also, ballast 10 provides for a design-adjustable bulk capacitor voltage that allows the designer to achieve a good compromise between the competing requirements of power factor correction and lamp current crest factor. The end result is a power factor corrected electronic ballast that is not only cost-effective and energy efficient, but that also preserves the operating life of the lamps.

Although the present invention has been described with reference to certain preferred embodiments, numerous modifications and variations can be made by those skilled in the art without departing from the novel spirit and scope of this invention.

What is claimed is:

1. An electronic ballast for powering at least one gas discharge lamp, comprising:
   a rectifier circuit comprising a pair of input terminals adapted to receive a source of alternating current, a first output terminal coupled to a DC rail node, and a second output terminal coupled to a circuit ground node;
   a modified valley-fill arrangement, comprising:
      a single line blocking rectifier having an anode coupled to a first node and a cathode coupled to the DC rail node; and
      a single bulk capacitor coupled between the first node and the circuit ground node;
   an inverter having a pair of input connections and a pair of output connections, the input connections being coupled to the output terminals of the rectifier circuit;
   an output circuit coupled across the inverter output connections, the output circuit having first and second output wires directly connectable to at least one gas discharge lamp, wherein the ballast is operable to provide a lamp current through the lamp, the lamp current including positive half-cycles wherein a positive current flows out of the first output wire and into the second output wire, and negative half-cycles wherein a positive current flows out of the second output wire and into the first output wire; and
   a charging circuit coupled between the second output wire and the first node, the charging circuit being operable to provide power factor correction by feeding back at least a portion of the positive half-cycles of the lamp current to the bulk capacitor, wherein the charging circuit comprises:
      a DC blocking capacitor having a first end coupled to both the second output wire and the lamp, and a second end coupled to a second node;
      a lamp current blocking rectifier having an anode coupled to the circuit ground node and a cathode coupled to the second node; and
      a charging rectifier having an anode coupled to the second node and a cathode coupled to the first node.

2. The electronic ballast of claim 1, wherein the rectifier circuit further comprises:
   a full-wave diode bridge; and
   a high frequency bypass capacitor coupled between the first and second output terminals of the rectifier circuit.

3. The electronic ballast of claim 1, wherein the inverter comprises:
   a first inverter switch coupled between a first input connection and a first output connection of the inverter; and a second inverter switch coupled between the first and second output connections of the inverter.

4. The electronic ballast of claim 1, wherein the inverter comprises:

a clamp transformer having a primary winding coupled between the first input connection and the first output connection of the inverter, and a secondary winding coupled between a third node and the circuit ground node;

a single inverter switch coupled between the first and second output connections of the inverter;

a clamping capacitor coupled between the third node and the first output connection of the inverter; and a clamping rectifier having an anode coupled to the third node and a cathode coupled to the first input connection of the inverter.

5. The electronic ballast of claim 1, wherein the output circuit further comprises:

a resonant inductor coupled between the first output connection of the inverter and the first output wire of the output circuit; and a first resonant capacitor coupled between the first output wire of the output circuit and the circuit ground node.

6. The electronic ballast of claim 5, wherein the output circuit further comprises a second resonant capacitor coupled between the first and second output wires of the output circuit.

7. The electronic ballast of claim 5, wherein the charging circuit further comprises a shunt capacitor coupled between the second output wire and the circuit ground node.

8. The electronic ballast of claim 7, wherein the output circuit further comprises a second resonant capacitor coupled between the first and second output wires of the output circuit.

9. The electronic ballast of claim 1, wherein the output circuit further comprises:

a resonant inductor coupled between the first output connection of the inverter and the first output wire of the output circuit;

a third output wire coupleable to the first output wire through a first gas discharge lamp filament;

a fourth output wire coupleable to the second output wire through a second gas discharge lamp filament; and a first resonant capacitor coupled between the third and fourth output wires.

10. The electronic ballast of claim 9, wherein the charging circuit further comprises a shunt capacitor coupled between the second output wire and the circuit ground node.

* * * * *